Patented Nov. 19, 1929

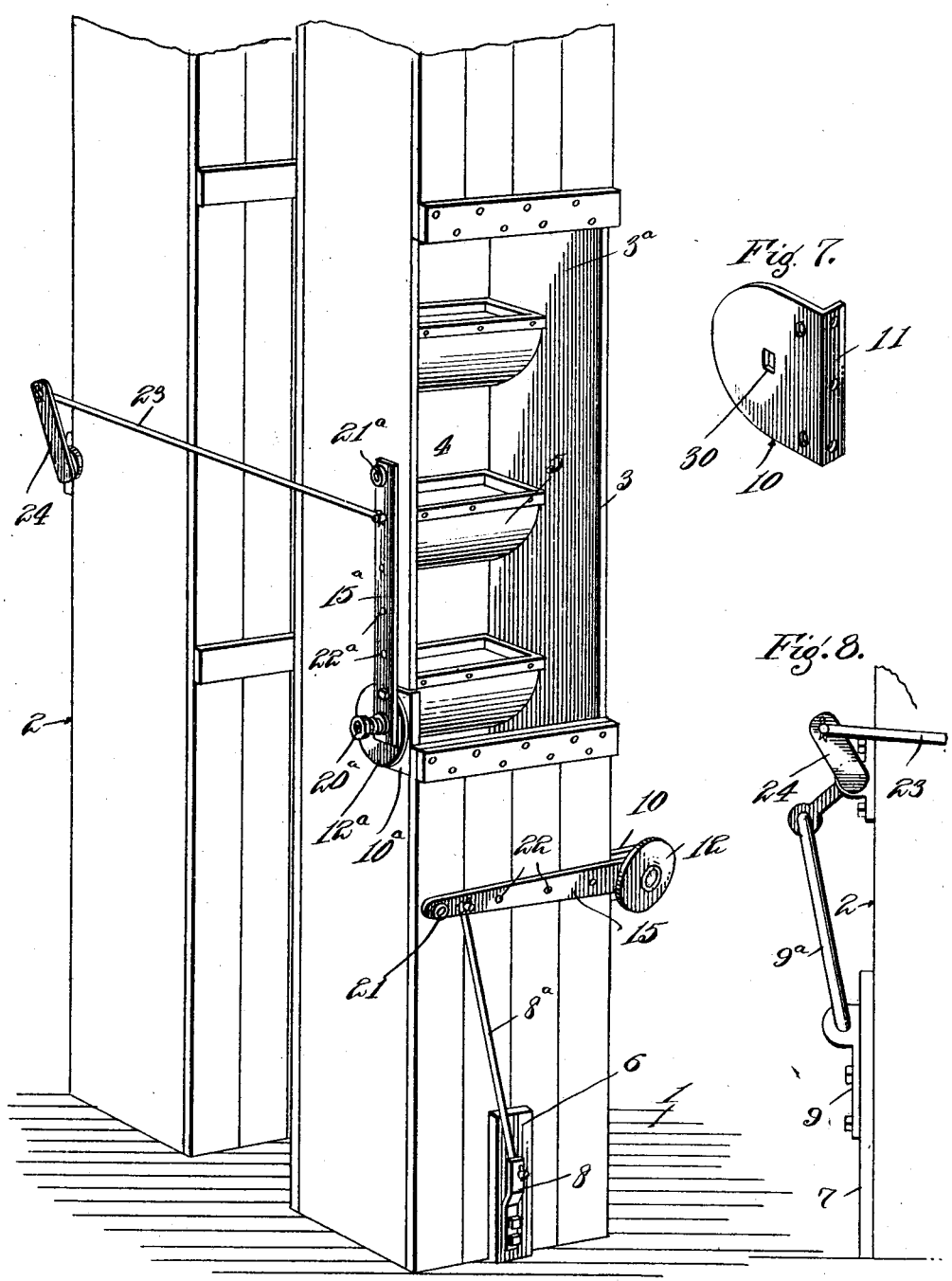

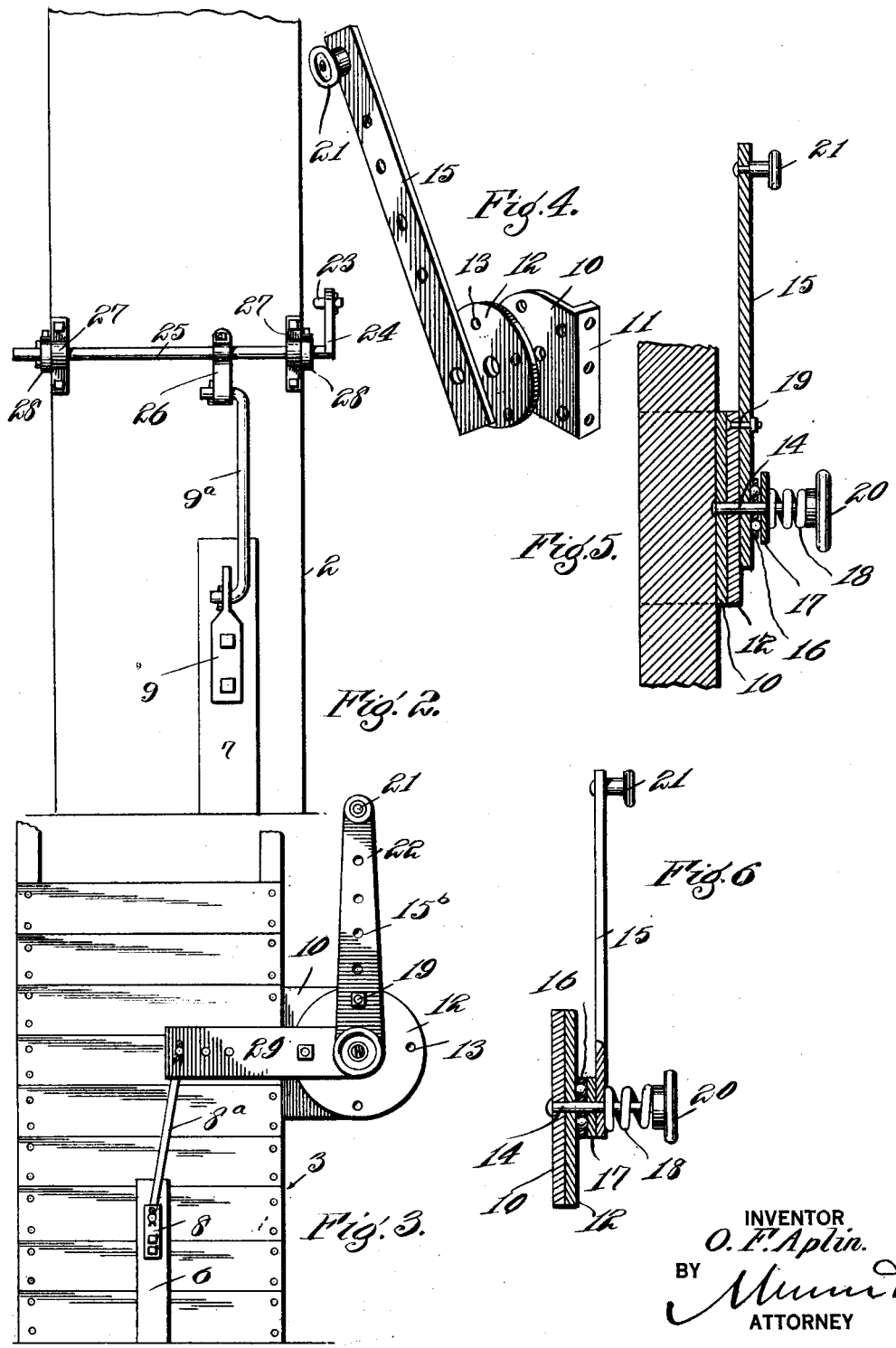

1,736,691

UNITED STATES PATENT OFFICE

OLE F. APLIN, OF CULBERTSON, MONTANA

FEED-GATE CONTROL

Application filed January 30, 1928. Serial No. 250,542.

This invention relates to improvements in elevators of the kind having an endless chain of buckets, the object being to provide simple means for cutting off the supply of grain or other material after a certain amount shall have passed into the elevator and thereby prevent choking of the buckets while running at full speed.

A primary object of the invention is to provide a device for operating elevator feed gates which is so constructed as to allow the quick opening and closing of the gate as well as a close adjustment thereof.

Another object of the invention is to provide a device for holding the feed gate in an open position until it is desired to close it and to so hold it without its being absolutely rigid.

Still another object of the invention is to provide a friction control means of this character whereby the operating device is rendered somewhat elastic, the purpose of which is to permit the gate to be quickly opened and closed.

In carrying out these objects, the invention is susceptible of modification without departing from the spirit or sacrificing any of the advantages of the claimed invention; there being shown in the drawings for illustrative purposes a preferred and practical form, in which:

Figure 1 represents a perspective view of the lower portion of a two-legged grain elevator with this improved feed gate controlling device shown applied, Fig. 2 is a rear elevation of the rear leg of the elevator, Fig. 3 is a front elevation, showing a slightly different form of gate control, Fig. 4 is a group view in perspective of the control shown in Figs. 1 and 2, Fig. 5 is a vertical section thereof, Fig. 6 is a view partly in elevation and partly in section of the control, Fig. 7 is a detail perspective view of one of the friction plates forming a part of the feed control; and Fig. 8 is a detail side elevation of a portion of the operating levers.

In the embodiment illustrated, a supervising or operating platform of an endless bucket elevator is shown at 1 through which extends the legs or flues 2 and 3 of the elevator and which are designed to extend upward to the point of discharge, not shown. Operating through these flues and around a drum in the casing located below the platform 1, and which is not herein shown, is an endless apron 4 carrying the buckets 5.

Valve gate stems are shown at 6 and 7 and are designed for controlling the valves which are movable in the feed chutes, not shown, the valves operating to cut off and control the feed supply through the chutes. Connected with these valve stems 6 and 7 by straps 8 and 9 are rods $8^a$ and $9^a$, the rod $8^a$ being connected with the stem of the valve which controls the supply of material to the elevator leg 3 while rod $9^a$ is connected with the stem 7 of the valve which controls the leg 2.

A plate or bracket 10 which constitutes one element of the gate control device has a laterally extending apertured flange 11 which is designed to be bolted to one face of the elevator leg or flue 3, and which plate 10, in connection with a disk 12 forms a friction control member of the device constituting the invention. The disk 12 is provided with a plurality of countersunk bolt receiving openings 13 which are designed to receive a head of the bolt which connects said disk with an operating lever 15 the countersunk portions of the apertures being arranged adjacent the opposed face of the plate 10 so that the disk may move freely over said plate without the bolt heads contacting therewith. A square shouldered bolt 14 extends through the opening 30 in plate 10, through the disk 12 and one end of the lever 15 as is shown clearly in Figs. 5 and 6 and has arranged thereon between the lever 15 and the disk 12 a thrust washer 16 fitted with ball bearings to eliminate friction being transmitted to the hand wheel 20 which is threaded on the outer end of the bolt 14. A steel washer 17 is located between the thrust washer and a coiled spring 18 which encircles the bolt 14 said washer forming a bearing between the spring and the thrust washer. A taper-head bolt 19 connects the disk 12 with the lever 15, the head of said bolt fitting in the countersunk portion of the aperture 13 in the disk as is shown clearly in Fig. 5.

A hand grip 21 is attached to and extends laterally from the outer end of the lever 15.

It will thus be obvious that the metal disk 12 operating against the adjacent face of the plate 10 and being held tightly together by means of the coiled spring 18 will operate to frictionally hold the lever 15 in any desired adjusted position, it being of course understood that the tension of the spring 18 may be varied by screwing up or unscrewing the hand wheel 20. The lever 15 is provided with a plurality of longitudinally spaced apertures 22 to provide for the adjustable connection with the lever or the rod $8^a$ which connects the lever 15 with the valve stem 6 and by means of which the valve which controls the inlet of material to the leg 3 may be either opened or closed at the will of the operator.

Mounted on the side face of the leg 3 is a valve control device similar in every way to that just described which is mounted on the front of said leg for controlling the opening of the valve connected with the stem 6. This valve control is numbered similar to the valve control shown at the front of the leg except that the exponent "a" is used on the reference numerals. This location of the two levers 15 and $15^a$ permits them to be conveniently operated by an attendant standing adjacent the front portion of the leg 3, from which point he may observe the buckets 5 in the leg 3 through the opening $3^a$ formed in the front wall thereof.

A rod 23 connects the lever $15^a$ with an arm 24 which extends laterally from one end of a rod 25 mounted in suitable bearings on the rear face of the rear leg 2, as is shown clearly in Fig. 2. Another rocker arm 26 is carried by the rod 25 and connects with the rod $9^a$ which is designed for controlling the gate stem 7 for opening and closing the gate on which said stem is mounted.

The shaft 25 has mounted thereon outside the bearings 27, collars 28 which are designed to hold the shaft 25 in proper position.

It will thus be seen that when the lever $15^a$ is actuated that the valve stem 7 will be raised or lowered according to the direction in which said lever is swung and that it will be held in adjusted position by the frictional engagement of the disk $12^a$ with the plate $10^a$.

The plate 10 has the aperture 30 therein through which the shouldered bolt 14 is designed to pass made angular, being here shown square, with the side walls of which the shoulder of the bolt engages to prevent the bolt from turning during the adjustment of the spring 18 by means of the hand-wheel 20.

In Fig. 3 the gate actuating lever $15^b$ is the same as that shown in the other figures except that it is provided with a right-angular extension arm 29 through which it is connected with the rod $8^a$ carried by the valve stem 6 thus adapting the lever $15^b$ to be used in an upright position and at the same time control a vertically operating gate or valve.

It will thus be seen that owing to the frictional contact of the disk 12 with the plate 10 and the compression by means of the coiled spring controlled by the handwheel, will provide a control which is somewhat elastic and which thus provides for the quick opening and closing of the gate, as well as for the close adjustment thereof.

It is, of course, understood that the device may be used for other purposes than for that shown, and that the main purpose of the device, as shown, applied to an elevator, is to hold a feed gate in an open position until it is desired to close it and to provide means for making quick and easy tension adjustment to compensate for slides of different weights of material handled, and without the use of any tools. This is accomplished by using a ball-bearing thrust bearing; a square shouldered bolt in a square hole which will not turn while making the adjustments and a handwheel.

Without further description it is thought that the features and advantages of the invention will be readily apparent to those skilled in the art, and it will of course be understood that changes in the form, proportion and minor details of construction may be resorted to, without departing from the spirit and scope of the claimed invention.

I claim:—

A control device for gates, valves and the like comprising two complementary members, one having means for connection with the object to be controlled and the other means for connection with a support, a ball-bearing thrust bearing located between said members, one of said members having an angular bolt hole therein, a square shouldered bolt adapted to be passed through said members with the shoulder thereof located in said opening to prevent turning of the bolt, a hand wheel threaded on said bolt, and a coiled spring located between the hand wheel and the outer member whereby the parts are yieldably held in adjusted position, the hand wheel being adjustable to vary the tension of the spring without necessitating the use of any tools.

Signed at Culbertson, in the county of Roosevelt and State of Montana this 24th day of January, 1928.

OLE F. APLIN.